US010614628B2

(12) United States Patent
Glazer et al.

(10) Patent No.: US 10,614,628 B2
(45) Date of Patent: *Apr. 7, 2020

(54) METHOD FOR SUPPORTING THE USAGE OF A COMPUTERIZED SOURCE DEVICE WITHIN VIRTUAL ENVIRONMENT OF A HEAD MOUNTED DEVICE

(71) Applicant: SCREENOVATE TECHNOLOGIES LTD., Ra'anana (IL)

(72) Inventors: Joshua Glazer, Ra'anana (IL); Sagiv Philipp, Ra'anana (IL)

(73) Assignee: SCREENOVATE TECHNOLOGIES LTD., Ra'Anana (IL)

(*) Notice: Subject to any disclaimer, the term of this patent is extended or adjusted under 35 U.S.C. 154(b) by 0 days.

This patent is subject to a terminal disclaimer.

(21) Appl. No.: 15/643,161

(22) Filed: Jul. 6, 2017

(65) Prior Publication Data
US 2018/0144553 A1    May 24, 2018

Related U.S. Application Data

(60) Provisional application No. 62/347,740, filed on Jun. 9, 2016.

(51) Int. Cl.
G06T 19/00       (2011.01)
G06F 3/01        (2006.01)
G06K 9/46        (2006.01)
H04N 5/225       (2006.01)
G06F 3/0338      (2013.01)
(Continued)

(52) U.S. Cl.
CPC ............ G06T 19/006 (2013.01); G06F 3/012 (2013.01); G06F 3/013 (2013.01); G06F 3/0338 (2013.01); G06F 3/0426 (2013.01);
G06F 3/0484 (2013.01); G06K 9/00355 (2013.01); G06K 9/4604 (2013.01); H04N 5/2253 (2013.01)

(58) Field of Classification Search
CPC ... G06T 19/006; G06F 3/0484; G06F 3/0426; G06F 3/012; G06F 3/013; G06F 3/0338; H04N 5/2253; G06K 9/4604
See application file for complete search history.

(56) References Cited

U.S. PATENT DOCUMENTS

| 2011/0273380 A1* | 11/2011 | Martin | G06F 3/04883 345/173 |
| 2012/0249587 A1* | 10/2012 | Anderson | G06F 3/04895 345/633 |
| 2015/0094142 A1* | 4/2015 | Stafford | G06F 3/04815 463/31 |

* cited by examiner

Primary Examiner — Tapas Mazumder
(74) Attorney, Agent, or Firm — Browdy and Neimark, P.L.L.C.

(57) ABSTRACT

A method and a system for interfacing at least one computerized source device from within a Virtual Reality (VR) environment, produced by a head mounted VR display device, said method comprises the following steps:
  presenting a virtual 3D surface within the VR environment;
  receiving streaming media data from at least one source device as streaming video;
  displaying the said streaming video within the VR environment as a 2D video projection over the said at least one virtual 3D surface;
  identifying a condition wherein the user directs his/her gaze towards a designated direction;
  commanding a camera to produce a video stream, capturing the user's interaction with an input device of the at least one source device; and (Continued)

displaying said streaming video from said camera within the VR environment, showing the user's interaction with the said input device.

12 Claims, 12 Drawing Sheets

(51) Int. Cl.
*G06F 3/0484* (2013.01)
*G06F 3/042* (2006.01)
*G06K 9/00* (2006.01)

Mirroring module 300:

1. Mirroring streaming data from an external source device, and presenting it within the VR environment > Displaying at least one virtual 3D surface within the VR environment by the display integrator module 370. 302
>
> Receiving streaming media data (e.g. screen capture, displayed video, etc.) on the VR streaming module 350. Said streaming data originating from the streaming module 500 on a source device 20. 304
>
> Displaying the said streaming media data content originating from the said source device within the VR environment, as a 2D video projection over the said at least one virtual 3D surface by the display integrator module 370. 306
>
> Receiving by the head gestures module 360 sensory data from the VR sensors 200 module (e.g. data originating from a gyroscope or an accelerometer). 308
>
> Detecting by the head gestures module 360 at least one of yaw, pitch and roll direction of the head-mounted VR display device from the said obtained sensory data 310
>
> Detecting by the head gestures module 360 motion of the of the head-mounted VR display device from the said obtained sensory data. 312
>
> Optionally detecting motion of the of the head-mounted VR display device from a video stream originating from a head mounted camera 100A 314
>
> Moving the 3D surfaces and projected 2D videos in the VR space, in association with said detected motion and direction of the head-mounted VR device by the display integrator module 370. 316

Figure 3A

Mirroring module 300:

2. Conditional presentation of video camera content within the VR environment

---

Receiving by the head gestures module 360 sensory data from the VR sensors 200 module (e.g. data originating from a gyroscope or an accelerometer).     316

Ascertaining by the head gestures module 360 the direction at which the user is turning his/her gaze (e.g. downwards);     318

Identifying by the head gestures module 360 a condition wherein the user directs his/her gaze towards the designated direction of at least one input device (e.g. downwards, toward a keyboard) .     320

When the user is gazing towards the said designated direction, commanding a camera device 100A/120B/120/C to produce a video stream, via the streaming module 500/500C . The said camera captures the view of the user's interaction with a input device 40 of the at least one source device.     322

When the user is gazing towards the said designated direction, receiving a video stream from a camera device 100A/120B/120/C, wherein said camera captures the view of the user's interaction with a input device 40 of the at least one source device.     324

When the user is gazing towards the said designated direction, the camera video stream will be displayed within the VR environment as a 2D video projection over the said at least one virtual 3D surface, showing the user's interaction with the input device 40 (e.g. typing on a keyboard).     326

When the user ceases his/her gaze towards the designated direction, commanding the camera to halt the video stream via the streaming module 500/500C, and the display integrator module 370 stops displaying the user's interaction with the interface within the VR environment     328

Figure 3B

Streaming module 500 on the source device

---

Receiving a request for connecting to the head mounted device from the VR streaming module 350  502

Optionally receiving from the mirroring module 300 within the mounted display device 10, data originating from the motion detection module 800.

Said data may include, for example: commands for displaying specific images on the sources device, playing video and/or audio, increasing music volume, decreasing image brightness etc.  504

Optionally receiving from the mirroring module 300 within the mounted display device 10, data originating from the head gestures module 360

Said data may include, for example: commands for selecting specific source devices, selecting specific icons on said selected source devices, executing specific applications on said selected source devices etc.  506 streaming media data (e.g. screen capture, displayed video, etc.) to the VR streaming module 350 within the VR display unit.

508

According to some embodiments, the said streaming will be performed according to the said commands from the motion detection module 800 and / or the head gestures module 360.

Streaming video content from a camera 500B associated with the source device 20, to the VR streaming module 350 within the VR display unit.

510

According to one embodiment, the said streaming will be performed according to the said commands from the mirroring module 300.

Optionally applying actions (e.g. launching an application) on the source device 20, according to the said commands from the mirroring module 300.

Streaming module 500C on an independent camera apparatus 100C

Receiving a request for connecting to the head mounted device from the VR streaming module 350
514

Streaming video data from a camera 100C to the VR streaming module 350.
516

Optionally receiving from the VR streaming module 350 a request to cease the streaming of video to the head mounted device, and consequently halting the said stream of video.
518

Figure 4B

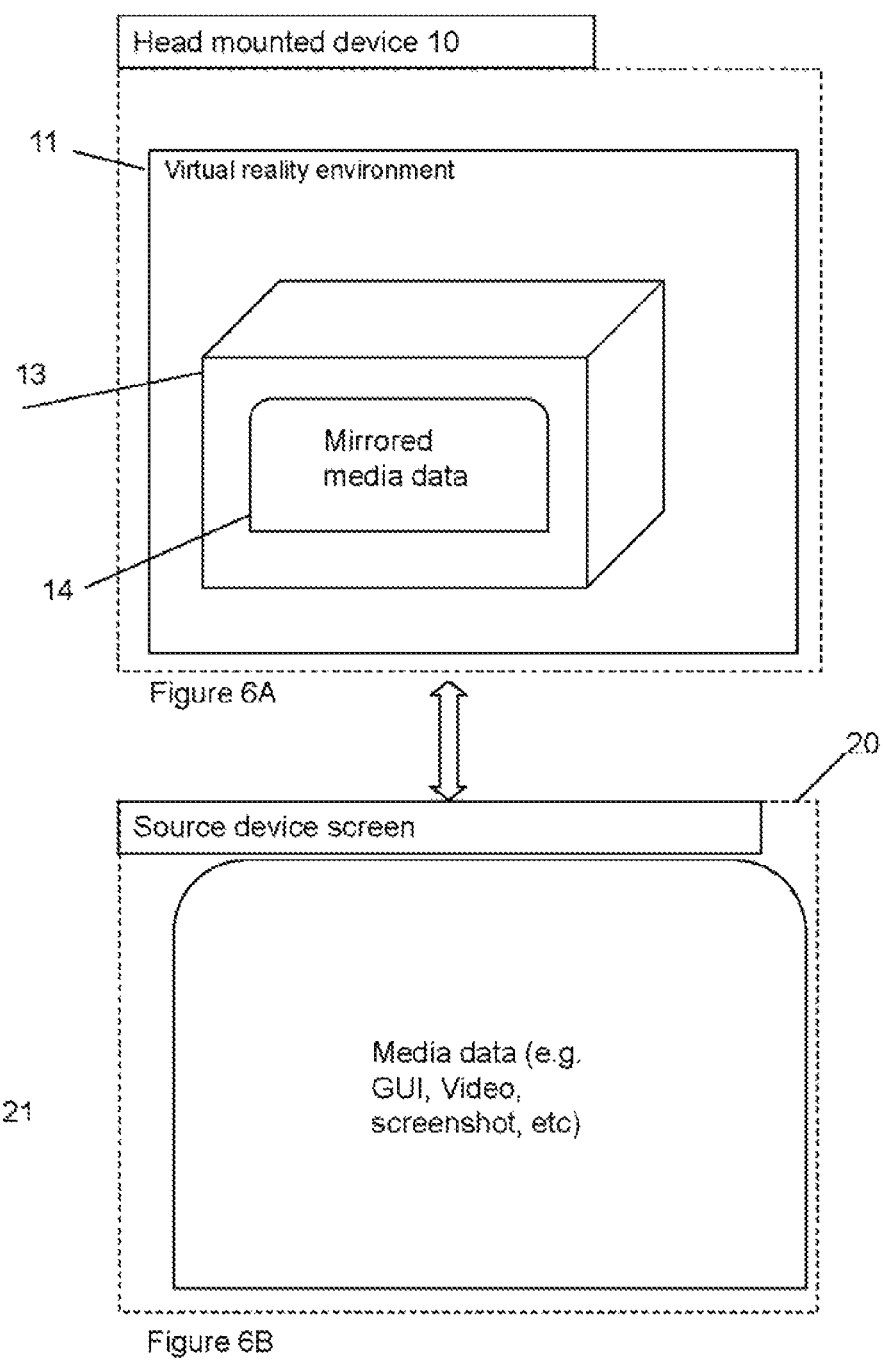

METHOD FOR SUPPORTING THE USAGE OF A COMPUTERIZED SOURCE DEVICE WITHIN VIRTUAL ENVIRONMENT OF A HEAD MOUNTED DEVICE

TECHNICAL FIELD

The present invention relates to the field of wireless mirroring of media data such as 2D images from a source device to a 3D environment, and more particularly, to mirroring media data such as 2D images from source device to 3D virtual environment.

SUMMARY OF INVENTION

The present invention discloses a method for interfacing at least one computerized source device from within a Virtual Reality (VR) environment, produced by a head mounted VR display device, implemented by one or more processors operatively coupled to a non-transitory computer readable storage device, on which are stored modules of instruction code that when executed cause the one or more processors to perform at least one of the following steps:
  presenting at least one virtual 3D surface within the VR environment;
  receiving streaming media data from at least one source device as streaming video;
  displaying the said streaming video originating from the said source device within the VR environment, as a 2D video projection over the said at least one virtual 3D surface;
  detecting at least one of yaw, pitch and roll direction of the head mounted VR display device, to ascertain the direction at which the user is turning his/her gaze;
  identifying a condition wherein the user directs his/her gaze towards a designated direction;
  whereupon identification of said condition, commanding a camera to produce a video stream, capturing the view of the user's interaction with an input device (e.g. keyboard, mouse) of the at least one source device;
  receiving said streaming video from said camera; and
  displaying said streaming video from said camera within the VR environment as a 2D video projection over the said at least one virtual 3D surfaces, showing the user's interaction with the said input device.

According to some embodiments, the said method further comprises the steps of:
  identifying a condition wherein the user ceases his/her gaze towards the said designated direction;
  wherein upon identification of said condition the said camera will stop producing the said video stream; and
  halting the display of said streaming video of the user's interaction with the input device within the VR environment.

According to some embodiments, the said camera is configured to be one of:
  integrated within the head-mounted VR display device;
  integrated within, or operatively associated with a source device;
  a standalone camera, independent of the VR display device or source device.

According to some embodiments, the said VR display device is configured to interface a plurality of cameras, and integrate the presentation of a plurality of streaming videos originating from said plurality of cameras within the VR environment.

According to some embodiments, the said VR display device is further configured to perform the following steps:
  activate said camera integrated within the head-mounted VR display device;
  receive streaming video from said camera 100A; and
  apply an image processing algorithm to the said streaming video, to extract information regarding the head-mounted VR display device's motion and direction.

The present invention further discloses a system for interfacing at least one computerized source device from within a Virtual Reality (VR) environment, said system comprising:
  a head mounted VR display device, configured to produce said Virtual Reality (VR) environment;
  a processing unit, comprising a non-transitory computer readable storage device and one or more processors operatively coupled to the storage device, on which are stored modules of instruction code executable by the one or more processors, whereupon execution of the said code implements the functions of the VR display device;
  wherein said VR display device further comprising a VR display integrator module, configured to present at least one virtual 3D surface within the VR environment;
  wherein said VR display device further comprising a VR mirroring module configured to receive streaming media data from at least one source device as streaming video;
  wherein said VR mirroring module is further configured to display the said streaming video originating from the said source device within the VR environment, as a 2D video projection over the said at least one virtual 3D surface;
  wherein said VR display device further comprising a head gestures module configured to detect at least one of yaw, pitch and roll direction of the head mounted VR display device, to ascertain the direction at which the user is turning his/her gaze;
  wherein said head gestures module is further configured to identify a condition in which the user directs his/her gaze towards a designated direction;
  wherein upon identification of said condition the said VR mirroring module is further configured command a camera to produce a video stream, capturing the view of the user's interaction with a input device of the at least one source device;
  wherein said VR mirroring module is further configured to receive said streaming video from said camera; and
  wherein said VR display integrator module is further configured to display said streaming video from said camera within the VR environment as a 2D video projection over the said at least one virtual 3D surfaces, showing the user's interaction with the said input device.

According to some embodiments of the said system:
  said head gestures module identifies a condition wherein the user ceases his/her gaze towards the said designated direction;
  said mirroring module is further configured to command the said camera to stop producing the said video stream upon identification of said condition; and
  said VR display integrator module is further configured to halt the display of said streaming video of the user's interaction with the input device 40 within the VR environment upon identification of said condition.

According to some embodiments the said camera is configured to be one of:

integrated within the head mounted VR display device;
integrated within, or operatively associated with a source device; or
a standalone camera, independent of the VR display device or source device.

According to some embodiments of the said system:
the VR display device is further configured to interface a plurality of cameras; and
the display integrator module is configured to integrate the presentation of a plurality of streaming videos from said plurality of cameras within the VR environment.

According to some embodiments the head gestures module is further configured to perform the following steps:
activate said camera integrated within the head-mounted VR display device;
receive streaming video from the head mounted camera; and
apply an image processing algorithm, to extract information regarding the head-mounted VR display device's motion and direction.

According to some embodiments, the said processing unit 30 physically resides within the head mounted VR display device.

According to some embodiments, the said processing unit 30 physically resides outside the head mounted VR display device, and communicates with the VR display device through wired or wireless communication.

According to some embodiments, the said input devices provide user input to source devices, and include at least one of keyboards, mouse devices, and mouse pen devices.

According to some embodiments, the said input devices include joysticks for PCs or gaming consoles.

BRIEF DESCRIPTION OF DRAWINGS

FIG. 3A is a flowchart diagram illustrating the functionality of the mirroring module, mirroring streaming data from an external source device, and presenting it within the VR environment, according to some embodiments of the invention.

FIG. 3B is a flowchart diagram the functionality of the mirroring module, applying conditional presentation of video camera content within the VR environment, according to some embodiments of the invention.

FIG. 4A is a flowchart diagram illustrating the functionality of the streaming module 500 on the source device, according to some embodiments of the invention.

FIG. 4B is a flowchart diagram illustrating the functionality of the streaming module 500C, on an external camera 100C apparatus, according to some embodiments of the invention.

FIGS. 6A and 6B form a schematic diagram, depicting the action of mirroring content from a selected mobile device 20 to the head mounted display unit 10, and displaying it within the 3D VR environment, according to some embodiments of the invention.

MODES FOR CARRYING OUT THE INVENTION

Figure 1A:
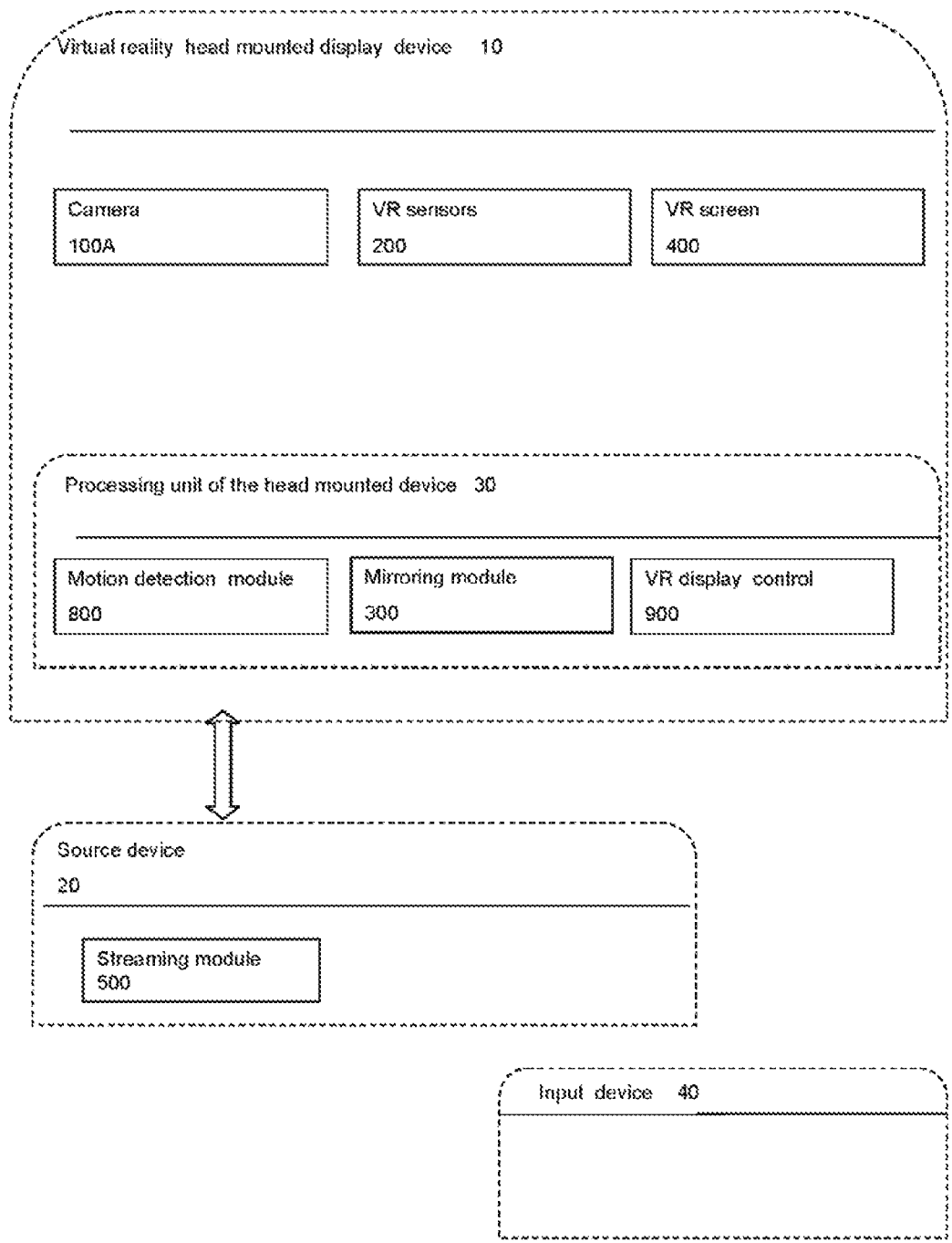
FIG. 1A is a block diagram of a head mounted Virtual Reality (VR) display device associated with a processing unit, a source computer device, an input device and a camera installed on head mounted display device, according to some embodiments of the invention.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The term "source device" as used herein in this application, is defined as a device such as Smartphone, tablet PC, laptop or desktop PC, or any wireless computerized device, such as a security camera.

The term "media data" as used herein in this application, refers to any type of communication or data that is exchanged between a source device and a 3D virtual environment display device such as head mounted display device. The said media data includes, for example: images, video streams, audio streams, text, phone calls, signaling data etc.

The present invention discloses a head mounted VR display device, configured to interface at least one source device, display media data from the said at least one source device within the VR environment, and enable user interaction with the source device(s) through the VR environment.

FIGS. 1A, 1B, 1C and 1D are block diagrams depicting a head mounted VR display device 10 associated with a processing unit 30, at least one computerized source device 20, a camera 100A/100B/100C and an input device 40, according to some embodiments of the invention.

The head mounted VR display device 10 is associated with processing unit 30, which manages the communication with the at least one source device, and the display of audiovisual content within the VR environment.

The VR display device 10 provides a 3D virtual environment, and facilitates various applications such as games, virtual conference rooms, augmented reality environments etc. The present invention further facilitates capabilities such as:
Mirroring media data from at least one source device, including video and audio content, onto the virtual 3D environment;

Interaction with the content and applications of the mirrored source device 20 from within the virtual 3D environment, by means of head gestures and limb movements;

Displaying the interaction of a user with a physical input device (e.g. typing on a physical keyboard), and integrate it within the displayed VR environment;

According to some embodiments of the present invention, the source device 20 can mirror the same or different media data to multiple head mounted devices simultaneously.

The functionality of the VR display device 10 is implemented by one or more processors operatively coupled to a non-transitory computer readable storage device, on which are stored modules of instruction code. Executing the said code by the said one or more processors causes the VR display device 10 to perform the functions elaborated further on in this application.

The said one or more processors and non-transitory computer readable storage devices are located within the processing unit 30. According to some embodiments, the processing unit 30 physically resides within the head mounted display device 10, as depicted in FIGS. 1A, 1C and 1D.

According to other embodiments, the VR display device 10 only contains inherent hardware modules (e.g. sensors 200, VR display screen 400 and a mounted camera 100A), whereas the processing unit 30 resides outside the VR display device 10. In this embodiment, the processing unit 30 communicates with the said inherent components through wired or wireless communication, as depicted in FIG. 1B.

Figure 1B:
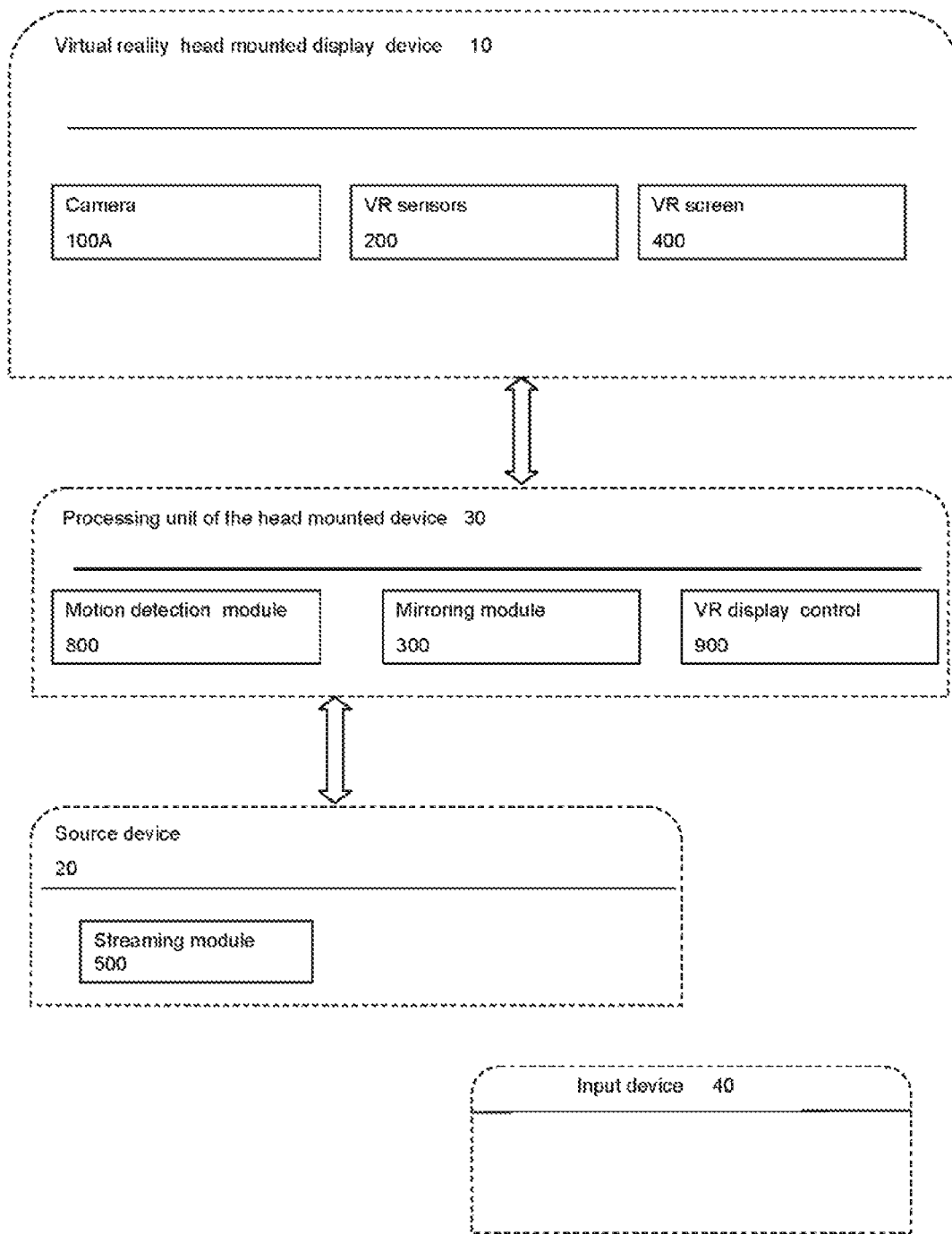
FIG. 1B is a block diagram of a head mounted VR display device associated with a processing unit, a source computer device, an input device and a camera installed on the source device, according to some embodiments of the invention.
Figure 1C:
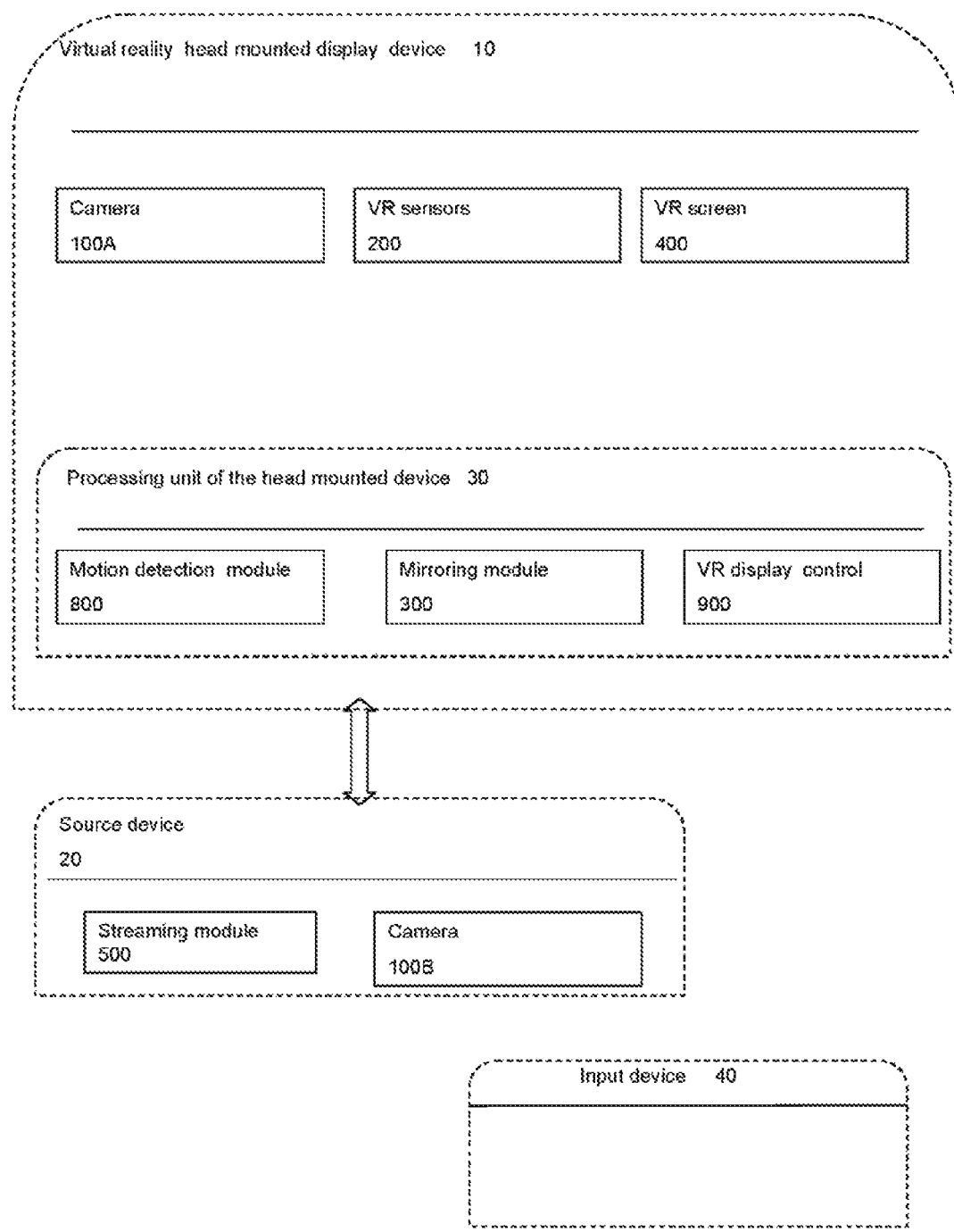
FIG. 1C is a block diagram of a head mounted VR display device associated with a processing unit, a source computer device, an input device and an independent camera, according to some embodiments of the invention.
Figure 1D:
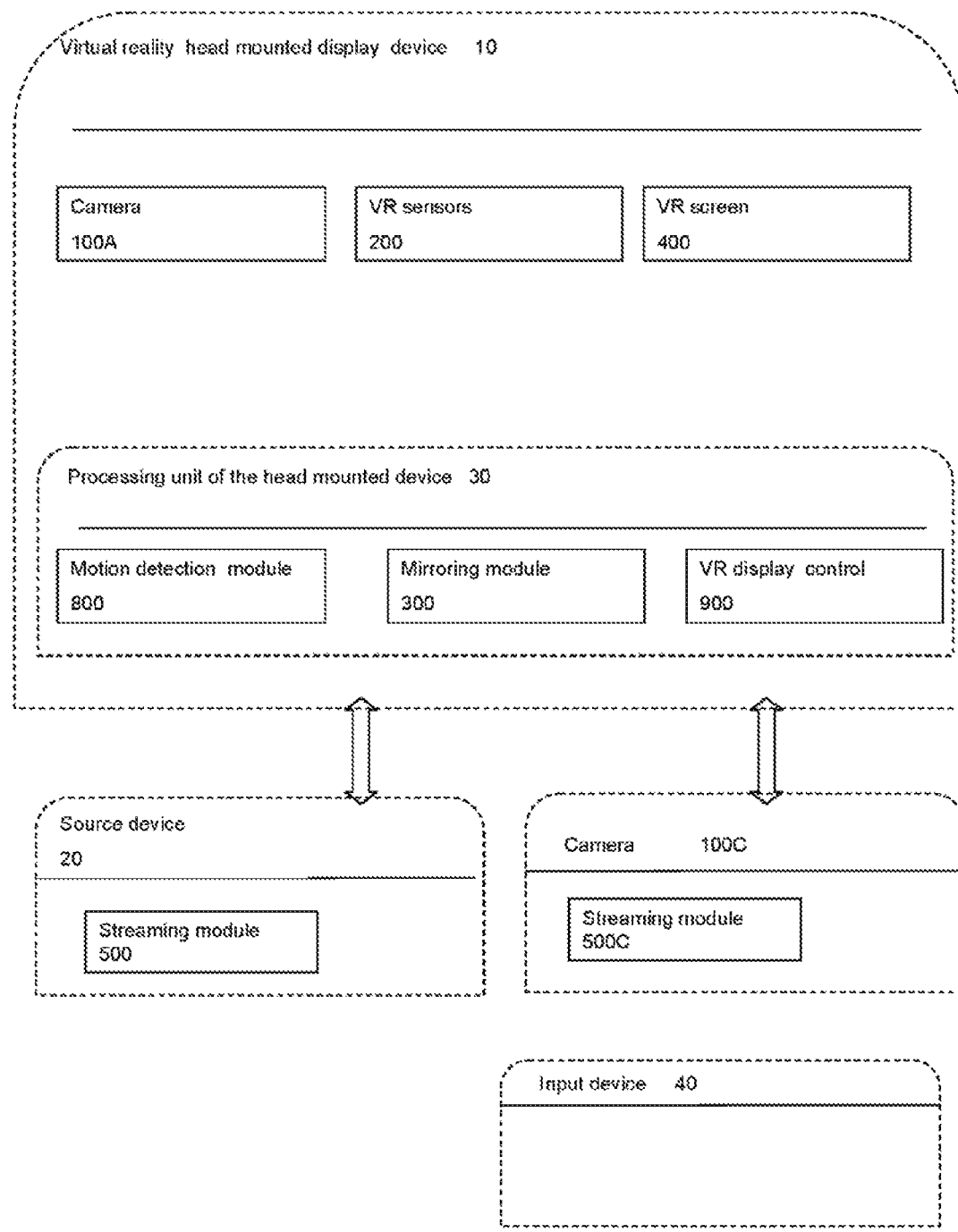
FIG. 1D is a block diagram of a head mounted VR display device associated with a processing unit, a source computer device, an input device and a camera device which is a standalone camera, independent of the VR display device or the source device, according to some embodiments of the invention.

According to the embodiments depicted in FIGS. 1A, 1C & 1D, the VR display device 10 is associated with a camera device 100A/100B/100C respectively. The said camera device is configured to stream video data, to be displayed within the virtual 3D environment. According to some embodiments, the said camera device 100A/100B/100C is configured to capture the interaction of a user with an input device (e.g. moving a mouse or typing on a keyboard). This enables the user to see the said interaction as an integrated display within the VR environment.

FIGS. 1A, 1C & 1D depict different embodiments of the present invention, relating to the location of the said camera:

According to some embodiments of the present invention, as illustrated in FIG. 1A, the camera 100A is integrated within the VR display device 10.

According to some embodiments of the present invention, as illustrated in FIG. 1C, the camera device 100B is integrated within, or operatively associated with a source device 20 (e.g. a Smartphone or a laptop). The said camera 100B is configured to stream video data towards the VR display device 10 via a streaming module 500.

According to some embodiments of the present invention, as illustrated in FIG. 1D, the camera device 100C is a standalone camera, independent of the VR display device 10 or the source device 20. The said camera 100C is configured to stream video data towards the VR display device 10 via a streaming module 500C.

According to one embodiment, the VR display device 10 is configured to interface a plurality of cameras 100A/100B/100C, and integrate the presentation of streaming video from said plurality of cameras within the VR environment.

The mirroring module 300 resides within the processing unit 30 of the head mounted device 10. This module is configured to:

Receive incoming media data, including video and audio streams from the streaming module 500 on source devices, and/or from streaming modules 500C on standalone camera devices 100C;

Acquire user head gestures from VR sensors 200 (e.g. accelerometers) associated with the VR display device 10; and Display said received media data, including video streams within the VR environment.

The motion detection module 800 is configured to identify user limb movements, to facilitate user interaction with objects presented within the VR environment, and apply actions to source devices.

The source device 20 is a computerized apparatus such as a Smartphone, tablet PC, laptop or desktop PC, comprising a streaming module 500. The said streaming module is configured to wirelessly stream media data from the source device 20 to the VR display device 10, and facilitate user interaction with applications on the source device from within the VR environment.

According to a preferred embodiment, the input device 40 refers to devices that provide user input to source devices, e.g.: keyboards, mouse devices, mouse pen devices etc. According to another embodiment, said input devices may refer to additional types of User Interfaces (UIs), such as joysticks for PCs or gaming consoles.

Figure 2:
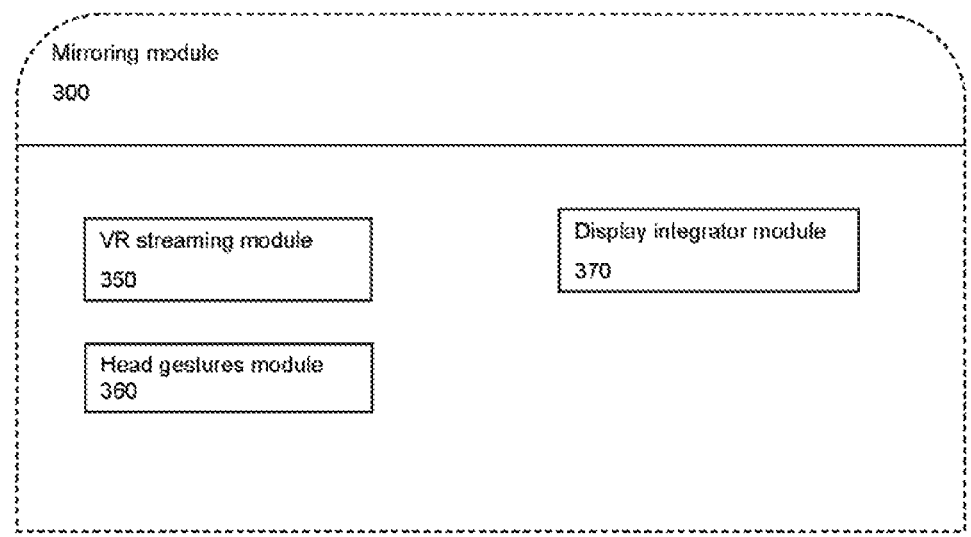
FIG. 2 is a schematic block diagram, elaborating the content of the mirroring module, according to some embodiments of the invention.

FIG. 2 is a schematic block diagram, elaborating the content of the mirroring module 300, according to some embodiments of the invention. The modules comprising the mirroring module 300 include at least one of:

The VR streaming module 350, configured to receive streaming media data, originating from at least one source module 20 or camera 100A/100B/100C.

The head gestures module 360 is configured to ascertain the direction and motion of the head mounted VR display device 10.

The display integrator module 370 is configured to integrate the said data (i.e. the streaming media data from one or more source devices and cameras), and present the said data within the VR environment as elaborated below.

FIG. 3A is a flowchart diagram, illustrating the functionality of the mirroring module 300, when mirroring streaming data from at least one external source device 20, and presenting it within the VR environment, according to some embodiments of the invention.

The display integrator module 370 displays at least one virtual 3D surface within the VR environment. The said 3D surface may be formed as either a closed shape (e.g. a sphere, a cube or any arbitrary shape) or an open surface (step 302).

The VR streaming module 350 receives streaming media data (e.g. captured screen images from computerized source devices 20, displayed video stream, audio stream etc.) originating from a streaming module 500 on a source device 20, or from a camera device 100A/100B/100C (step 304).

The display integrator module 370 displays video streaming media data content originating from the said source device or cameras within the VR environment, as a 2D video projection over the said at least one virtual 3D surface (step 306).

According to one embodiment, the display integrator module 370 plays received media data audio streams within the head mounted VR display device 10.

The head gestures module 360 receives sensory data from the VR sensors 200 module (e.g. data originating from a gyroscope or an accelerometer) (step 308). It detects at least one of yaw pitch and roll direction of the head-mounted VR display device 10 from the said obtained sensory data (step 310).

The head gestures module 360 detects motion of the head-mounted VR display device 10 from the said obtained sensory data (step 312).

According to one embodiment, the head gestures module 360 detects motion of the head-mounted VR display device 10 through the head mounted camera 100A (step 314). In this embodiment, the head gestures module 360 is configured to perform the following steps:

Activating the head mounted camera 100A;
Receiving streaming video from the head mounted camera 100A;
Applying an image processing algorithm, to extract information regarding the head-mounted VR display device's 10 motion and direction.

The display integrator module 370 moves the said 3D surfaces and projected 2D videos within the VR space, in association with said detected motion and direction of the head-mounted VR display device 10 (step 316).

FIG. 3B is a flowchart diagram illustrating the functionality of the mirroring module 300, performing conditional presentation of video camera content within the VR environment, according to some embodiments of the invention.

According to this embodiment, the video stream will be presented within the VR environment only when the user gazes at the direction of the input device, thus enabling the user to observe their interaction with the input device (e.g. typing on the keyboard) from within the VR environment.

The head gestures module 360 obtains sensory data from the VR sensors 200 module (e.g. data originating from a gyroscope or an accelerometer) on the head mounted VR display device 10 (step 316).

The head gestures module 360 detects at least one of yaw pitch and roll direction of the head-mounted VR display device 10 from the said obtained sensory data. The head gestures module 360 ascertains the direction at which the user is directing his/her gaze (step 318). The head gestures module 360 identifies a condition wherein the user directs his/her gaze towards the designated direction of at least one input device 40 (e.g. downwards, towards a keyboard) (step 320);

When the user is gazing towards the said designated direction, the mirroring module 300 commands the streaming module 500/500C to stream video from a camera device 100A/100B/100C towards the VR streaming module 350, wherein the said camera captures the view of the user's interaction with a input device 40 (step 322). The VR streaming module 350 receives the said streaming video originating from the said camera device 100A/100B/100C (step 324).

When the user is gazing towards the designated direction, the display integrator module 370 displays the camera video stream within the VR environment as a 2D video projection over the said at least one virtual 3D surface, showing the user's interaction with the input device (e.g. typing on a keyboard) (step 326).

When the user ceases his/her gazing toward the designated direction, the mirroring module 300 commands the camera to halt the video stream via the streaming module 500/500C, and the display integrator module 370 stops displaying the user's interaction with the input device 40 within the VR environment (step 328).

According to one embodiment, the VR display device 10 is further configured to interface a plurality of cameras 100A/100B/100C, and the display integrator module 370 is configured to integrate the presentation of a plurality of streaming videos from said plurality of cameras 100A/100B/100C within the VR environment FIG. 4A is a flowchart diagram illustrating the functionality of the streaming module 500 at the source device according to some embodiments of the invention.

The streaming module 500 receives a request for connecting to the VR display device 10 via the VR streaming module 350 (step 502).

According to some embodiments, the streaming module 500 receives from the mirroring module 300 data originating from the motion detection module 800, including commands that are to be applied on the source device 20. Said commands include, for example: displaying specific images on the sources device, playing specific video and/or audio, adjusting said audio and video parameters (e.g.: music volume, image brightness) etc. (step 504).

According to some embodiments, the streaming module 500 receives from the mirroring module 300 data originating from the head gestures module 360, including commands to be applied to the source device 20. Said commands may include, for example: selecting a specific source device 20, selecting specific icons on a selected source device, launching specific applications on a selected source devices etc. (step 506)

The streaming module 500 streams media data (e.g. screen capture, displayed video, etc.) to the VR streaming module 350 (step 508).

According to some embodiments, the said streaming is performed according to the said commands originating from the motion detection module 800 and/or the head gestures module 360. For example, an image presented on a Smartphone source device 20 may be mirrored within the VR environment. The Image's brightness may be controlled according to the user's head gestures.

The streaming module 500 streams video content from a camera 500B associated with the source device 20, to the VR streaming module 350 (step 510).

According to one embodiment, the said streaming of video is performed according to the said commands from the motion detection module 800 and/or the head gestures module 360. For example, a video stream may be presented within the VR environment. The resolution or size of the presented video may be controlled according to the user's hand gestures.

The streaming module 500 optionally applies actions (e.g. launches an application) on the source device 20, according to the said commands from the mirroring module 300.

FIG. 4B is a flowchart diagram illustrating the functionality of the streaming module 500C on an external camera 100C apparatus, according to some embodiments of the invention (step 512).

The streaming module 500C receives a request for connecting to the head mounted device from the VR streaming module 350 (step 514).

The streaming module 500C streams video data from a camera 100C to the VR streaming module 350 (step 516).

The streaming module 500C optionally receives from the VR streaming module 350 a request to cease the streaming of video to the head mounted device, and consequently halts the said stream of video (step 518).

Figure 5:
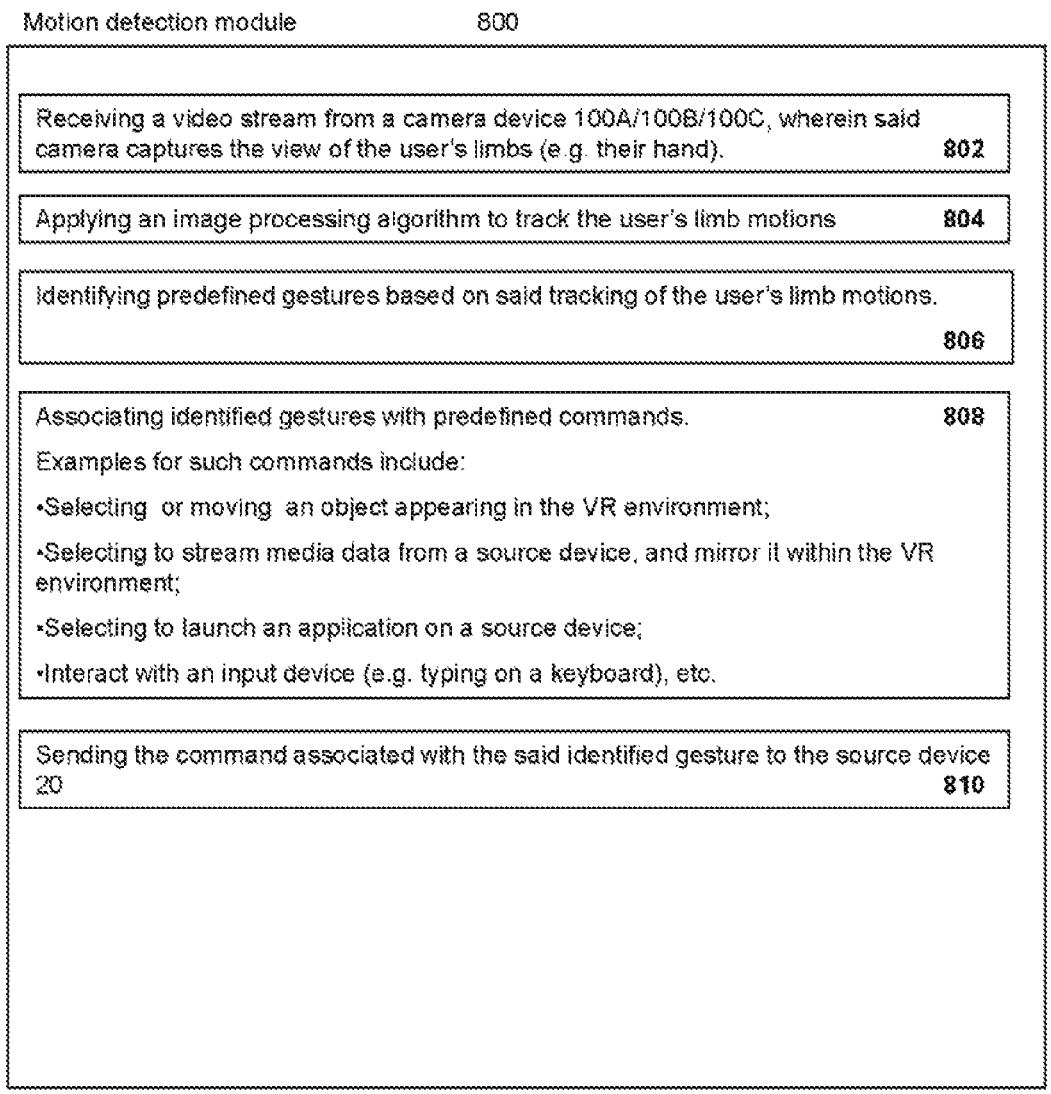
FIG. 5 is a flowchart diagram illustrating functionality of the motion detection module 800 according to some embodiments of the invention.

FIG. 5 is a flowchart diagram illustrating the functionality of the motion detection module 800 according to some embodiments of the invention.

The motion detection module 800 receives a video stream from a camera device 100A/100B/100C, wherein said camera captures the view of the user's limbs (e.g. their hands) (step 802).

The motion detection module 800 is configured to apply an image processing algorithm, to track the user's limb motions (step 804).

The motion detection module 800 identifies predefined gestures of the user limb movements, based on said tracking of the user's limb motions (step 806).

The motion detection module 800 associates identified gestures with predefined commands (step 808). Examples for said predefined commands are:
- Selecting or moving an object appearing within the VR environment;
- Selecting to stream media data from a source device, and mirror it within the VR environment;
- Selecting to launch an application on a source device;
- Interaction with an input device (e.g. typing on a virtual keyboard, within the VR environment).

The motion detection module 800 sends the command associated with the said identified gesture to the source device 20 (step 810).

FIGS. 6A and 6B form a schematic diagram, depicting the action of mirroring streamed content 21 of media data from a selected source device 20 to the VR display device 10, and displaying it within the 3D VR environment, according to some embodiments of the invention. The said mirrored content is presented as 2D projection 14 over a 3D virtual surface 13.

Figure 7A:
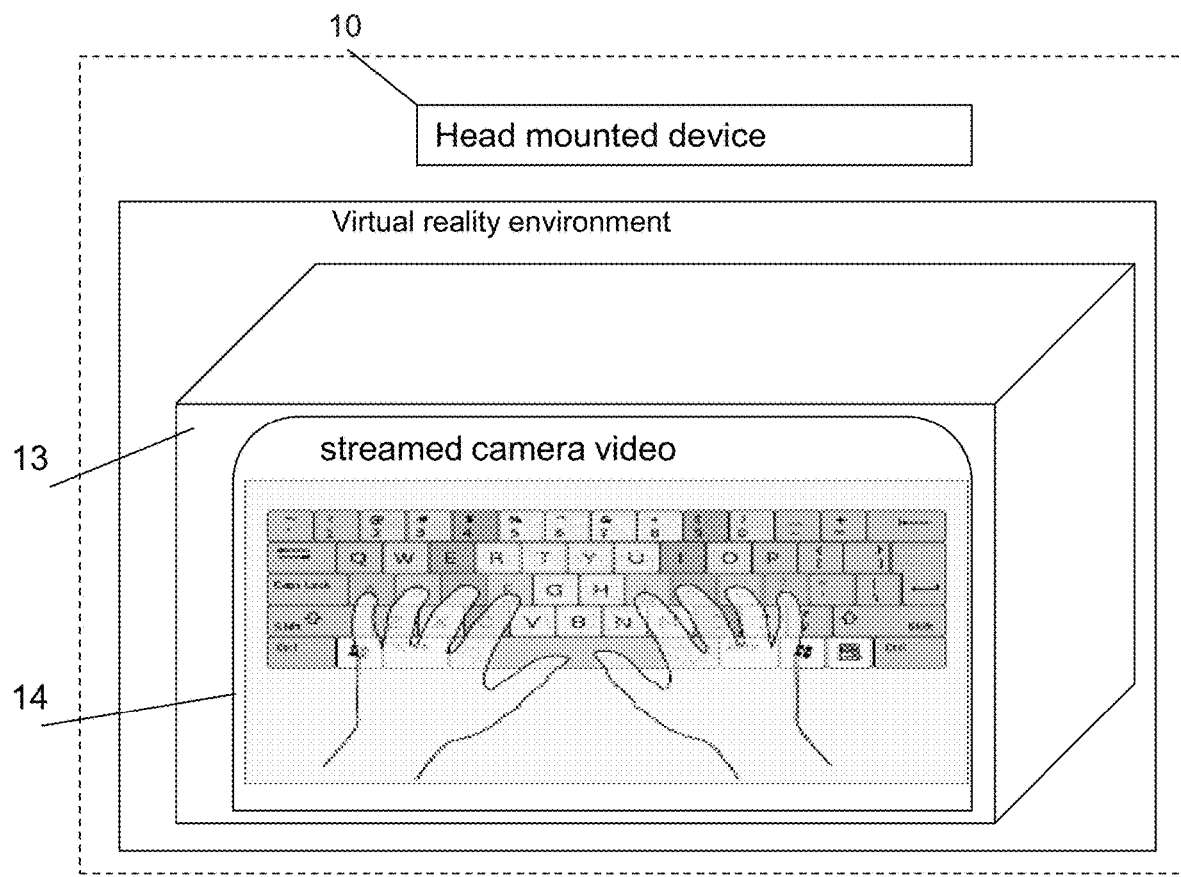
FIG. 7A,7B form a schematic diagram, depicting the action of streaming video content from a camera device 100A/100B/100C to the head mounted display unit 10, and displaying it within the 3D VR environment, according to some embodiments of the invention.
Figure 7B:
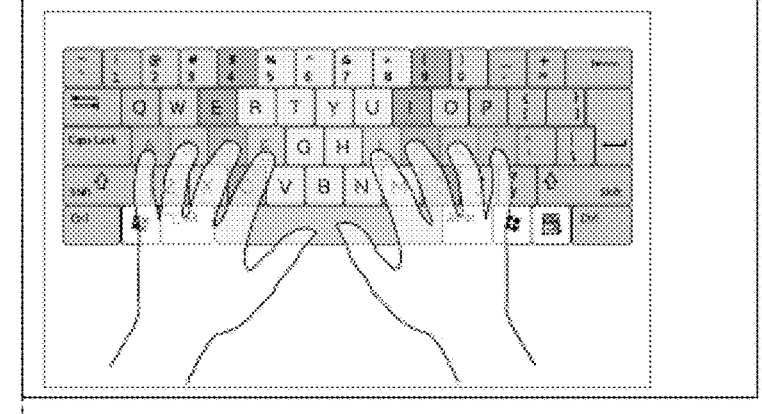

FIGS. 7A and 7B form a schematic diagram, depicting the action of streaming video content from a camera device 100A/100B/100C to the head mounted VR display device 10, and displaying it within the 3D VR environment, according to some embodiments of the invention. The said streaming video 22, of a user interacting with an input device (i.e. typing on a keyboard) is presented as a 2D projection 14 over a 3D virtual surface 13.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

What is claimed is:

1. A method for interfacing at least one computerized source device from within a Virtual Reality (VR) environment, produced by a head mounted VR display device, implemented by one or more processors operatively coupled to a non-transitory computer readable storage device, on which are stored modules of instruction code that when executed cause the one or more processors to perform at least one of the following steps:
   - presenting at least one virtual 3D surface within the VR environment;
   - receiving streaming media data from at least one source device as streaming VR environment video;
   - displaying the said streaming VR environment video originating from the said source device within the VR environment;
   - detecting at least one of yaw, pitch and roll direction of the head mounted VR display device, to ascertain the direction at which the user is turning his/her gaze;
   - identifying a condition that indicates the user directs his/her gaze towards a designated direction;
   - whereupon identification of said condition, commanding a camera to produce a steaming user interaction video, capturing the view of the user's interaction with at least one input device of the at least one source device;
   - receiving said streaming user interaction video from said camera;

displaying said streaming user interaction video from said camera within the VR environment as a 2D video projection over the said at least one virtual 3D surfaces, showing the user's interaction with the said at least one input device; and identifying a stop condition indicating the user ceases his/her gaze towards the said designated direction;

wherein upon identification of said stop condition the display is halted of said streaming user interaction video of the user's interaction with the at least one input device within the VR environment, while continuously displaying the streaming VR environment video, and while maintaining user interaction with the input device to imitate real-life use of the input device while the user gazes in a direction other than at the input device; and wherein the streaming user interaction video will be presented within the VR environment only when the user gazes at the direction of the input device, thus enabling the user to observe the user's interaction with the input device from within the VR environment.

2. The method of claim 1, wherein said camera is configured to be one of:
integrated within the head-mounted VR display device;
integrated within, or operatively associated with a source device;
a standalone camera, independent of the VR display device or source device.

3. The method of claim 2, wherein the VR display device is configured to interface a plurality of cameras, and integrate the presentation of a plurality of streaming videos originating from said plurality of cameras within the VR environment.

4. The method of claim 2, wherein the VR display device is further configured to perform the following steps:
activate said camera integrated within the head-mounted VR display device;
receive streaming video from said camera; and
apply an image processing algorithm to the said streaming video, to extract information regarding the head-mounted VR display device's motion and direction.

5. A system for interfacing at least one computerized source device from within a Virtual Reality (VR) environment, said system comprising:
a head mounted VR display device, configured to produce said Virtual Reality (VR) environment;
a processing unit, comprising a non-transitory computer readable storage device and one or more processors operatively coupled to the storage device, on which are stored modules of instruction code executable by the one or more processors, whereupon execution of the said code implements the functions of the VR display device;
wherein said VR display device further comprising a VR display integrator module, configured to present at least one virtual 3D surface within the VR environment;
wherein said VR display device further comprising a VR mirroring module configured to receive streaming media data from at least one source device as streaming VR environment video;
wherein said VR mirroring module is further configured to display the said streaming VR environment video originating from the said source device within the VR environment;
wherein said VR display device further comprising a head gestures module configured to detect at least one of yaw, pitch and roll direction of the head mounted VR display device, to ascertain the direction at which the user is turning his/her gaze;
wherein said head gestures module is further configured to identify a condition which indicates the user directs his/her gaze towards a designated direction;
wherein upon identification of said condition the said VR mirroring module is further configured command a camera to produce a streaming user interaction video, capturing the view of the user's interaction with at least one input device of the at least one source device;
wherein said VR mirroring module is further configured to receive said streaming user interaction video from said camera; and
wherein said VR display integrator module is further configured to display said streaming user interaction video from said camera within the VR environment as a 2D video projection over the said at least one virtual 3D surfaces, showing the user's interaction with the said at least one input device;
wherein said head gestures module identifies a stop condition indicating the user ceases his/her gaze towards the said designated direction;
wherein said VR display integrator module is further configured to halt the display of said video of the user's interaction with the at least one input device within the VR environment upon identification of said stop condition, while continuously displaying the streaming VR environment video, and while maintaining user interaction with the input device to imitate real-life use of the input device while the user gazes in a direction other than at the input device; and
wherein while the streaming user interaction video is presented the identified gestures are associated with predefined interaction with an input device virtual keyboard, within the VR environment.

6. The system of claim 5, wherein said camera is configured to be one of:
integrated within the head mounted VR display device;
integrated within, or operatively associated with a source device; or
a standalone camera, independent of the VR display device or source device.

7. The system of claim 5, wherein:
the VR display device is further configured to interface a plurality of cameras; and
the display integrator module is configured to integrate the presentation of a plurality of streaming videos from said plurality of cameras within the VR environment.

8. The system of claim 5, wherein the head gestures module is further configured to perform the following steps:
activate said camera integrated within the head-mounted VR display device;
receive streaming video from the head mounted camera; and
apply an image processing algorithm, to extract information regarding the head-mounted VR display device's motion and direction.

9. The system of claim 5, wherein said processing unit physically resides within the head mounted VR display device.

10. The system of claim 5, wherein said processing unit physically resides outside the head mounted VR display device, and communicates with the VR display device through wired or wireless communication.

11. The system of claim 5, wherein said at least one input device provides user input to source devices, and include at least one of keyboards, mouse devices, and mouse pen devices.

12. The system of claim 5, wherein said at least one input device includes joysticks for PCs or gaming consoles.

* * * * *